US005223156A

United States Patent [19]

Maier

[11] Patent Number: 5,223,156

[45] Date of Patent: Jun. 29, 1993

[54] PROCESS FOR REMOVING WASTE FROM FLUID MEDIA WITH PRODUCTION RESIDUES

[75] Inventor: Werner Maier, Deggingen, Fed. Rep. of Germany

[73] Assignee: Scheibel Versorgungsanlagen GmbH, Geislingen/Steige, Fed. Rep. of Germany

[21] Appl. No.: 558,995

[22] Filed: Jul. 27, 1990

[30] Foreign Application Priority Data

Aug. 12, 1989 [DE] Fed. Rep. of Germany ....... 3926700

[51] Int. Cl.⁵ ............................................. B23H 1/10

[52] U.S. Cl. .................................. 210/800; 210/805; 210/167; 210/168; 210/747; 137/563; 137/571; 137/575

[58] Field of Search .................. 210/805, 85, 205, 86, 210/136, 138, 167, 168, 171, 172, 194, 253, 257.1, 195.1, 262, 747, 416.5; 137/563, 571, 675; 184/6

[56] References Cited

U.S. PATENT DOCUMENTS

| | | | |
|---|---|---|---|
| 4,162,218 | 7/1979 | McCormick | 210/104 |
| 4,197,597 | 4/1980 | Toms | 210/205 |
| 4,857,688 | 8/1989 | Aso et al. | 137/563 |
| 4,898,262 | 2/1990 | Gorodissky et al. | 184/6 |
| 4,909,950 | 3/1990 | Katoh et al. | 210/805 |
| 5,032,290 | 7/1991 | Yamagata et al. | 137/563 |

*Primary Examiner*—Robert A. Dawson

*Assistant Examiner*—David Reifsnyder

*Attorney, Agent, or Firm*—Jenner & Block

[57] ABSTRACT

In a process and a system for removing waste including production residues from fluid media used with machinery, the medium from which waste is to be removed is transported from the respective place of accumulation via piping to a collecting tank. The medium from which waste is to be removed is pumped from the respective place of accumulation up to an elevated tank, from where it is passed on to the collecting tank located at a lower level continuously or intermittently via a closed piping system.

3 Claims, 1 Drawing Sheet

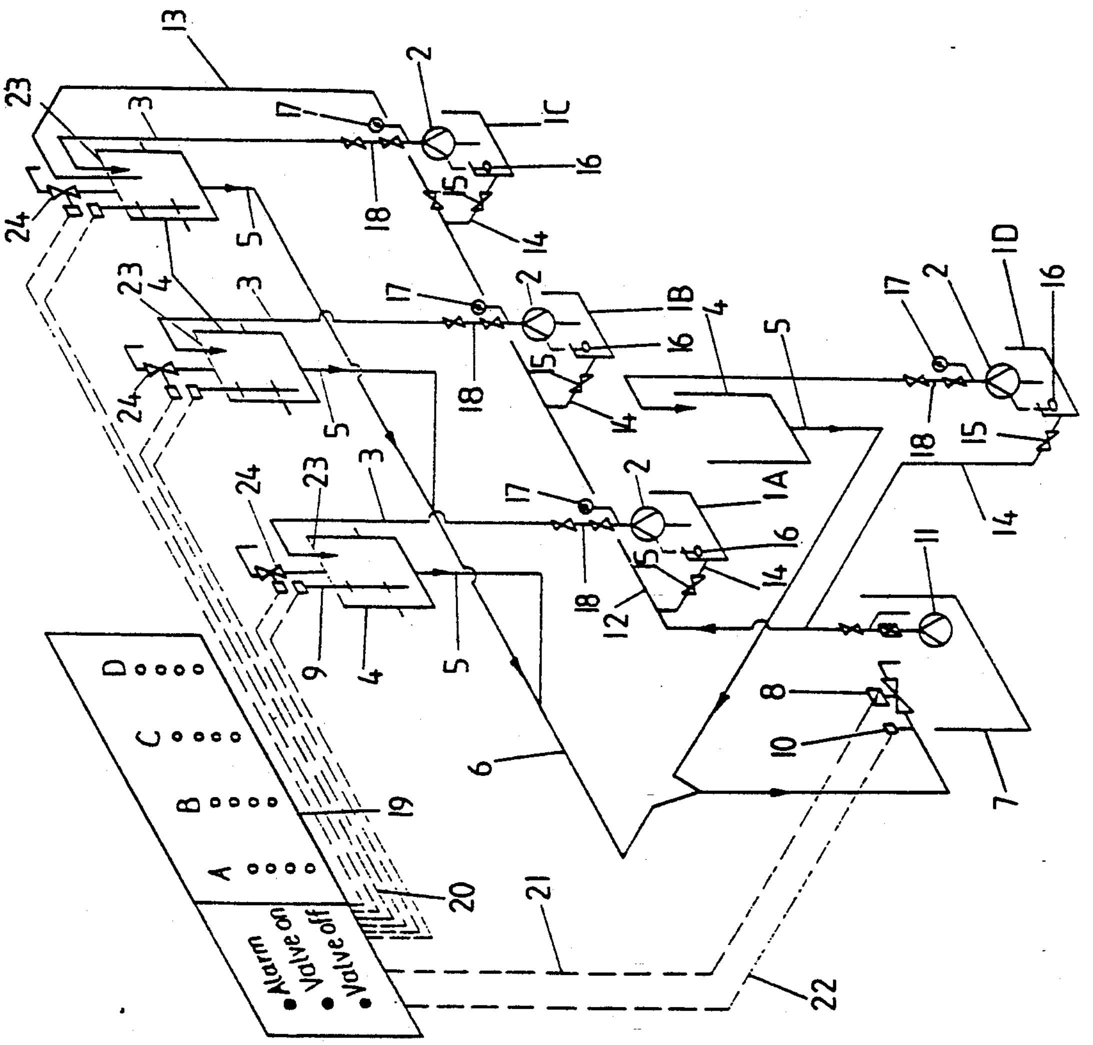
Alarm
Valve on
Valve off
A
B
C
D

PROCESS FOR REMOVING WASTE FROM FLUID MEDIA WITH PRODUCTION RESIDUES

TECHNICAL FIELD

The invention relates to a process and a system for removing waste from fluid media having production residues from industrial machines, and in particular to a system where the medium from which waste is to be removed is transported from the particular place where it accumulates through pipes to a collecting tank.

BACKGROUND OF THE INVENTION

Production media is used in manifold ways in industry, and waste has to be removed from them accordingly. This applies, for example, to coolants and abrasives, drilling and grinding oils which, for example, are used during the machining of materials on machine tools. After use, these fluid media must have waste removed from them, there frequently being production residues left in the medium, which should likewise be carried away.

For this purpose so-called open waste-removal channels or closed waste-removal pipes in the floor have been used, which are normally laid with an appropriate slope, and which terminate in a collecting tank likewise located at a lower level, which for this reason are usually located in the basement.

One disadvantage of this approach, however, is that such a waste-removal systems require a relatively great deal of space, since it is frequently necessary to place pipes or channels in the floor. Also, since at least only a flat slope is usually possible on most floors, a correspondingly low flow fluid media velocity results. This leads to dirt deposition by sedimentation, which is why additional measures, such as flushing nozzles or the like are necessary in order to clean the waste-removal channels or pipes.

In addition, when open channels are used there is a risk of an overflow, and when closed pipes are used they may be filled only up to approximately 50% as there must always be a corresponding air space available. A further disadvantage consists in the fact that during factory-internal changeovers in the building, problems may arise with the existing floor channels. Likewise, such floor channels typically cause a reduction in available production areas.

SUMMARY OF THE INVENTION

An object of the present invention is therefore to create a process and a system for removing waste from fluid media, which with simple construction and low space requirement permits good and trouble-free waste removal.

This problem is solved in that the medium from which waste is to be removed is pumped from the place where it accumulates to an elevated tank, from where it is continually or intermittently delivered via a closed piping system to a collecting tank located at a lower level.

With the process according to the invention, expensive floor channels can therefore be dispensed with. Because of the high elevation of the elevated tank, the piping system following the elevated tank(s) permits a very high flow velocity caused by the resulting geodetic head. This means that, for example, except for a vertical drop pipe, the remainder of piping system from the elevated inlet tank can be designed to be horizontal. Due to the high flow velocity, small pipe dimensions also are possible, which are more economical in price and have a lower space requirements.

Due to the resulting high flow velocity, a good self-cleaning effect is achieved preventing deposits in the pipes.

The process can be selected to be continuous or intermittent as a function of the prevailing flow rate and the fluid medium. If less medium flows, it can be collected in one or more elevated tanks and discharged periodically. Due to the closed piping system this creates a high negative pressure with a resultant high flow velocity, through which any deposits can be removed and the piping system thus flushed free without special measures.

In a further embodiment of the invention provision can be made for a common piping system for the medium pumped up from a multiplicity of accumulation places or supply tanks to their respective associated elevated tanks.

By means of the process according to the invention, a plurality of machines or items of equipment can have their waste removed centrally directly through associated elevated tanks and the succeeding collecting tank. In the same way, chips and other production residues are collected centrally. If required, further machines having fluid media from which waste is to be removed can also be connected to or integrated with the waste removal system.

In an advantageous further embodiment of the invention provision can be made for the medium to be pumped back to the places of accumulation or supply tanks from the collecting tank, if required after separation of contaminants.

In this way a closed circuit can be created for the waste removal system, it being necessary solely to ensure that accumulated contaminants such as chips, powder etc., are discharged via filters or other separating devices. As the case may be, it is then also necessary for the fluid medium to be prepared or regenerated prior to reintroduction into the circuit. This is, however, also made possible within the framework of the invention.

A system according to the invention is characterized by one or more elevated tanks disposed above the place(s) of accumulation or supply tanks of the machines, and which are each connected to the supply tanks by an elevated pipe, and by a piping system connecting the elevated tank(s) to a collecting tank located at a lower level.

In one embodiment the elevated inlet tank is designed to be open to the atmosphere.

In addition, in a further embodiment of the invention provision can be made for air which flows into the elevated tank, to be controllable by means of control and closure devices.

In this way the emptying velocity and the discharge behavior of the elevated tanks can be controlled. The elevated tank is then followed by the closed piping system. With a complete filling of the piping system and with a corresponding emptying into the collecting tank located at a lower level, air can be admitted into the elevated tank(s) and a high flow velocity results from of the high geodetic difference.

To permit intermittent operation and also a suitable simple cleaning and flushing of the piping system, a manual or automatically operable shut-off valve is generally provided ahead of the collecting tank, and in fact, close to it. If the shut-off valve is closed, the piping system and the elevated inlet tank fill up accordingly, and—after opening of the shut-off valve—rapid emptying takes place at a correspondingly high flow velocity.

For safety reasons and for optimum control, the elevated tank can also be provided in each case with a level indicating means.

To achieve a closed or largely closed flow circuit, a supply pipe to the supply tanks or accumulation places of the fluid medium is provided as a return pump pipe from the collecting tank with downstream cleaning stage.

In one advantageous embodiment a plurality of accumulation places or supply tanks are supplied from a common supply pipe, with branches fitted with connecting valves from the supply pipe each branching off to the supply tanks.

In this way, depending on requirements, the individual branches with their places of accumulation or supply tanks can be switched on accordingly for the medium from which waste is to be removed, while the others are switched off. This arrangement is of advantage where the supply pipe terminates in the final elevated tank.

In this way it can be ensured that there is always a sufficiently large quantity of fluid medium available, including weekend recirculation, which is conveyed in the circuit accordingly, because non-required medium flows from the final elevated tank via the piping system back to the collecting tank.

It is of advantage if the elevated piping from the places of accumulation or supply tanks to the respective elevated tanks is fitted with non-return valves, which avoids disturbances and backflows to the place of accumulation or supply tanks.

Crushing, separation, conveying and pumping means can be installed in the supply tanks and collecting tanks, which reduce the production residues into a size that can be transported in the system.

BRIEF DESCRIPTION OF THE FIGURE

The sole figure is a schematic drawing of a system for removing fluid media from production machinery according to the invention.

DETAILED DESCRIPTION OF THE INVENTION

The waste removal system for the fluid media, in which production residues may be present in fluid or solid form, operates basically on the principle of closed flow. In an industrial building there are, for example, a plurality of machine tools, each of which has an inlet or supply tank in its machine bed (not illustrated). In the embodiment presented, four supply tanks 1A, 1B, 1C and 1D are provided. It goes without saying that a number, however, can be chosen as desired. Each supply tank 1A, 1B, 1C and 1D is fitted with a pump 2 from which fluid medium can be pumped up through an elevated pipe 3 to an associated elevated tank 4. For example, open channel impeller pumps can be used as pumps 2, which can also convey chips and other coarser impurities. Crushing and/or separating means for coarse particles which would disturb transport can be installed in the supply tank 1, if necessary even ahead of pumps 2.

In accordance with the number of supply tanks, a corresponding number of elevated tanks 4, i.e. in the present case four pieces, are planned as accumulation places for the medium from which waste is to be removed. It goes without saying that it is not, however, absolutely necessary for each place of accumulation to have its own elevated tank 4. As the case may be, a plurality of places of accumulation may also have a single elevated tank 4, depending on the expected quantity of accumulation. Each elevated tank 4 can be designed as an open or partially open tank or, in other words, it is in connection with the atmosphere and is thus pressureless. In general, the elevated tank 4 is disposed at a height of approximately 2 meters above the supply tanks on a wall or on a column of the housing or the like. From each elevated tank there exits from the underside an outlet pipe 5 vertically or also inclined at an angle downwards to a collecting tank 7, which is common to all elevated tanks 4 and the associated outlet pipes 5 downwards. A collecting pipe 6 terminates in a collecting tank 7, which is located at least approximately on the level of the elevated tanks 1 or below it. The individual outlet pipes 5 of the elevated tanks 4 and the collecting pipe 6 together form a closed piping system. At the end of the collecting pipe 6 ahead of the collecting tank 7 a function shut-off valve 8 is installed in the collecting pipe 6.

Because of the elevated position of the elevated tanks 4, the collecting pipe 6 can, if needed, run horizontally, e.g. in non-disturbing positions in the building or on walls.

A level indicating means 9 is used to check the height of the fluid medium in the elevated tanks as well as to control the function of a shut-off valve 8, and to check the flow in a collecting pipe 6, a corresponding sensor 10 can be inserted in the pipe 6.

In the collecting tank 7 or after the cleaning and waste removal stage (not shown) there is a pump 11 from which a return pump pipe is led back as a central supply pipe 12 to the individual supply tanks. From the central supply pipe 12, which is led back at one end via a connecting pipe 13 into one of the elevated tanks 4, preferably the final elevated tank, branches 14 branch off in each case to the supply tanks 1A, 1B, 1C and 1D. The branches 14 for supply are each fitted with connecting valves 15 so that in each case a machine tool only receives the desired amount of fluid medium.

Each supply tank 1A, 1B, 1C, 1D is provided with a level means 16 with an associated control and monitoring unit so that, where required, in good time either the supply of fluid medium is interrupted or pump 2 is actuated accordingly to avoid an overflow. To check the pressure, each elevated pipe 3 can be fitted with a pressure gauge 17. Likewise each elevated pipe 3 can be fitted with a shut-off valve and non-return valve means 18.

For manual or automatic control a control console 19 is provided, to which corresponding control lines lead and from which they depart. This applies, for example, to a control line 20, from the level indicating means 9 of the elevated tanks 4 (for simplification, only one level indicating means is shown in the drawing), a control line 21 for actuation of the function shut-off valve 8 and control line 22 to the sensor 10.

Instead of an embodiment where the elevated tanks 4 are completely open, in a very advantageous embodiment provision can also be made for them to be covered in each case with a cover 23. Each cover 23 is provided with a control and closure means 24, through which the elevated tanks 4 are connected to the atmosphere. Through the control and closure means 24, air quantities which subsequently flow through the elevated tanks 4 can thus be controlled. Control of this can likewise be performed via control console 19.

Through this embodiment the discharge flow velocity and the discharge flow behavior can be controlled by the outlet pipes 5 and the collecting pipe 6.

As a further advantage a uniform filling of all elevated tanks can thus be achieved. For this purpose it is solely necessary that the connection to the atmosphere is blocked off during the filling-up phase by means of the control and closure means 24. Through this embodiment it is thus also achieved that via the respective outlet pipes 5, which are of course connected to each other via the collecting pipe 6, the elevated tanks 4 are uniformly filled even if the function/shut-off valves are simultaneously still closed. In this way the system is optimally utilized with regard to its fallibility.

At the same time, in this way collected air in the elevated tanks 4 and/or in the piping can of course be removed at any point from the system.

For better transport to the pumps, supply tanks 1 and also collecting tank 7 can be designed in the shape of a funnel.

The process according to the invention and the described means functions in the following way:

The dimensions of the supply tank 1, the elevated inlet tank 4 and the entire piping system are designed according to the quantity of waste material to be removed in such a way that a time-coordinated complete filling can be achieved. This means that, in addition to continuous operation of the system, with pumps 2 in each case being in operation, in whose supply tank 1 the medium from which waste is to be removed accumulates accordingly, the pumps 11 operate in order to convey in the circuit, work can also be performed in intermittent operation. This operation is particularly favorable if at times only little medium from which waste is to be removed accumulates and/or if there is a risk of sedimentation and thus of deposits in the piping. In such a case the function shut-off valve 8 is closed, and the operating pumps 2 deliver via the elevated tanks 4 and their outlet pipes 5 the fluid medium into the collecting pipe 6. The collecting pipe 6 and subsequently the vertical outlet pipes 5 run full and then also the elevated tanks 4. When a desired predetermined level in the elevated tanks 4 has been reached, which can be determined by the level indicating means 9, or also by manual actuation, the function shut-off valve is opened, causing a sudden emptying of the elevated inlet tanks 4, the associated outlet pipes 5 and the collecting pipe 6. Because of the level difference with the resulting geodetic head, a high negative pressure is achieved, which ensures a self-cleaning charge waste removal. With a correspondingly high accumulation of medium from which waste is to be removed, it goes without saying that the system can also be run in continuous operation, whereby, in accordance with the high quantity, a good continuous removal of waste is likewise ensured.

Through a corresponding time-coordinated interval control via the control console 19, the sedimentation velocity of the production residues can be taken into account accordingly.

Dependent upon the quantities of fluid from which waste is to be removed that accumulate and upon the residues, such as, for example, chips, grinding dust etc., a preparation of the medium and/or cleaning or separation from the contaminants is also performed. This can be take place in well-known means which are annexed to the collecting tank 7. It goes without saying that such a separation, recycling or cleaning can also be carried out in separate devices.

With the process of the closed flow into the outlet pipes 5 and the collecting pipe 6 according to the invention, with the utilization of a geodetic head a good hydraulic transport performance is achieved on the basis of the high fluid velocity. Floating and deposited production residues are thereby effectively transported without a risk of deposition.

I claim:

1. A method of removing a fluid media having production residues from a plurality of production machines comprising the steps of:

accumulating in a plurality of supply tanks associated with the production machines said fluid media:

pumping said fluid media from said supply tanks to at least one elevated tank located substantially above said supply tanks;

permitting said fluid media to flow from said elevated tanks to a collecting tank located below said elevated tanks in response to the geodetic head resulting from the location of said elevated tanks above said collecting tank; and pumping said fluid media from said collecting tank to said supply tank.

2. The method of claim 1 wherein in said step of pumping said fluid media to a plurality of said elevated tanks a single pipe connects said supply tanks to said elevated tanks.

3. The method of claim 1 additionally including the step of removing the production residues from said fluid media in said collecting tank.

* * * * *

UNITED STATES PATENT AND TRADEMARK OFFICE

CERTIFICATE OF CORRECTION

PATENT NO. : 5,223,156

DATED : June 29, 1993

INVENTOR(S) : Werner Maier

It is certified that error appears in the above-identified patent and that said Letters Patent is hereby corrected as shown below:

On the title page: Item

[73] Correct the Assignee's Name.
Change "Scheibel" to -- Scheible --

Signed and Sealed this

Eighteenth Day of October, 1994

Attest:

BRUCE LEHMAN

*Attesting Officer*

*Commissioner of Patents and Trademarks*

UNITED STATES PATENT AND TRADEMARK OFFICE
CERTIFICATE OF CORRECTION

PATENT NO. : 5,223,156

DATED : June 29, 1993

INVENTOR(S) : Werner Maier

It is certified that error appears in the above-identified patent and that said Letters Patent is hereby corrected as shown below:

On the title page, item:
[73] Change "Scheibel" to -- Scheible --
Column 1, line 30, after "such" delete "a"
Column 2, line 63, after "from" delete "of"
Column 6, line 17, before "take" delete "be"

Signed and Sealed this

Twentieth Day of June, 1995

*Attest:*

Bruce Lehman

BRUCE LEHMAN

*Attesting Officer* *Commissioner of Patents and Trademarks*